(12) United States Patent
Safai (10) Patent No.: US 11,315,751 B2
(45) Date of Patent: Apr. 26, 2022

(54) ELECTROMAGNETIC X-RAY CONTROL

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 16/394,667

(22) Filed: Apr. 25, 2019

(65) Prior Publication Data

US 2020/0343070 A1    Oct. 29, 2020

(51) Int. Cl.
| | | |
|---|---|---|
| *H01J 35/30* | (2006.01) | |
| *G01N 23/203* | (2006.01) | |
| *H01J 35/14* | (2006.01) | |
| *H01J 35/06* | (2006.01) | |
| *H05G 1/52* | (2006.01) | |

(52) U.S. Cl.
CPC ............ *H01J 35/30* (2013.01); *G01N 23/203* (2013.01); *H01J 35/064* (2019.05); *H01J 35/147* (2019.05); *H01J 35/153* (2019.05); *H05G 1/52* (2013.01); *G01N 2223/3103* (2013.01)

(58) Field of Classification Search
CPC .......... G01N 23/203; G01N 2223/3103; H01J 35/30; H01J 35/153; H01J 35/147; H01J 35/064
See application file for complete search history.

(56) References Cited

U.S. PATENT DOCUMENTS

| | | | | |
|---|---|---|---|---|
| 5,682,412 | A * | 10/1997 | Skillicorn | A61B 6/06 378/113 |
| 6,560,315 | B1 * | 5/2003 | Price | H01J 35/10 378/125 |
| 7,197,116 | B2 * | 3/2007 | Dunham | H01J 35/10 378/124 |
| 7,529,343 | B2 * | 5/2009 | Safai | H01J 35/10 378/125 |
| 8,740,880 | B2 * | 6/2014 | Pinault | A61N 5/1049 606/1 |
| 9,042,520 | B2 * | 5/2015 | Jeong | H01J 35/20 378/123 |
| 9,048,058 | B2 * | 6/2015 | Yamazaki | H01J 35/02 |
| 9,048,059 | B2 * | 6/2015 | Jeong | H01J 35/08 |

(Continued)

*Primary Examiner* — David P Porta
*Assistant Examiner* — Djura Malevic
(74) *Attorney, Agent, or Firm* — Kunzler Bean & Adamson (57) ABSTRACT

Disclosed herein is an apparatus for electromagnetic x-ray control. The apparatus comprises a thermionic filament, positioned at a first end of a micro-focus x-ray tube and configured to generate an electron stream. The apparatus also comprises an x-ray generation target, positioned within the micro-focus x-ray tube at a second end of the micro-focus x-ray tube, opposite the first end, to receive the electron stream and to generate x-rays in response to the electron stream impinging on the x-ray generation target. The apparatus further comprises an electromagnetic field element, configured to generate an electromagnetic field that receives the electron stream and operable to vary the electromagnetic field to redirect the electron stream, within the micro-focus x-ray tube, to impinge on the x-ray generation target at variable locations on the x-ray generation target. Each one of the variable locations corresponds to a different one of multiple variations of the electromagnetic field.

20 Claims, 3 Drawing Sheets

(56) References Cited

U.S. PATENT DOCUMENTS

| | | | |
|---|---|---|---|
| 9,101,039 B2* | 8/2015 | Ikarashi | H05G 1/58 |
| 9,111,655 B2* | 8/2015 | Ohashi | A61B 6/06 |
| 9,177,753 B2* | 11/2015 | Yamazaki | H01J 35/16 |
| 9,177,754 B2* | 11/2015 | Hansen | H01J 35/06 |
| 9,281,155 B2* | 3/2016 | Ueda | H05G 1/025 |
| 9,281,158 B2* | 3/2016 | Ogura | H01J 35/18 |
| 9,425,021 B2* | 8/2016 | Tamura | H01J 35/16 |
| 9,508,524 B2* | 11/2016 | Yanagisawa | H05G 1/04 |
| 9,595,415 B2* | 3/2017 | Ogura | G01N 23/04 |
| 9,748,070 B1* | 8/2017 | Wall | H01J 35/14 |
| 10,032,597 B2* | 7/2018 | Ohashi | H01J 35/025 |
| 10,319,555 B2* | 6/2019 | Hu | H01J 35/065 |
| 10,361,057 B2* | 7/2019 | Tsunoda | H01J 35/18 |
| 10,522,316 B2* | 12/2019 | Jeong | H01J 35/045 |
| 10,832,884 B2* | 11/2020 | Kim | H01J 35/04 |
| 2001/0019601 A1* | 9/2001 | Tkahashi | H01J 35/14 378/119 |
| 2003/0021377 A1* | 1/2003 | Turner | H01J 35/32 378/102 |
| 2005/0100133 A1* | 5/2005 | Reinhold | H05G 1/34 378/138 |
| 2005/0213709 A1* | 9/2005 | Dinsmore | H01J 35/18 378/119 |
| 2006/0104418 A1* | 5/2006 | Dunham | H01J 35/153 378/124 |
| 2007/0269014 A1* | 11/2007 | Safai | H01J 35/10 378/143 |
| 2010/0080357 A1* | 4/2010 | Katcha | H01J 35/10 378/124 |
| 2010/0303202 A1* | 12/2010 | Ren | H05G 1/52 378/62 |
| 2011/0066278 A1* | 3/2011 | Pinault | A61N 5/1049 700/213 |
| 2011/0116603 A1* | 5/2011 | Kim | H01J 35/16 378/119 |
| 2011/0222664 A1* | 9/2011 | Behling | H01J 35/305 378/124 |
| 2011/0255668 A1* | 10/2011 | Hoghoj | H01J 35/153 378/132 |
| 2012/0148027 A1* | 6/2012 | Jeong | H01J 35/065 378/106 |
| 2012/0163530 A1* | 6/2012 | Sainath | A61B 6/027 378/5 |
| 2012/0307974 A1* | 12/2012 | Yamazaki | H01J 35/066 378/62 |
| 2012/0307978 A1* | 12/2012 | Yamazaki | H01J 35/16 378/121 |
| 2012/0314837 A1* | 12/2012 | Tsujii | H01J 35/18 378/62 |
| 2013/0016810 A1* | 1/2013 | Tamura | H01J 35/16 378/62 |
| 2013/0016811 A1* | 1/2013 | Ueda | H05G 1/04 378/62 |
| 2013/0034207 A1* | 2/2013 | Aoki | H01J 35/16 378/62 |
| 2013/0129045 A1* | 5/2013 | Ogura | H01J 5/18 378/62 |
| 2013/0177130 A1* | 7/2013 | Konno | A61B 6/08 378/4 |
| 2013/0202089 A1* | 8/2013 | Schubert | G01V 5/0025 378/86 |
| 2013/0235975 A1* | 9/2013 | Tamura | H01J 35/13 378/62 |
| 2013/0235976 A1* | 9/2013 | Jeong | H01J 3/021 378/121 |
| 2013/0235977 A1* | 9/2013 | Grodzins | H01J 35/30 378/124 |
| 2014/0029729 A1* | 1/2014 | Kucharczyk | H01J 35/106 378/123 |
| 2014/0056406 A1* | 2/2014 | Yamazaki | H01J 37/09 378/62 |
| 2014/0126698 A1* | 5/2014 | Behling | H01J 35/101 378/62 |
| 2014/0153695 A1* | 6/2014 | Yanagisawa | H01J 35/16 378/62 |
| 2014/0185778 A1* | 7/2014 | Lee | H01J 35/12 378/124 |
| 2014/0270071 A1* | 9/2014 | Shirota | H01J 35/153 378/62 |
| 2014/0369467 A1* | 12/2014 | Yamazaki | H01J 9/395 378/51 |
| 2014/0369470 A1* | 12/2014 | Ukiyo | H01J 35/16 378/62 |
| 2015/0078533 A1* | 3/2015 | Chan | H01J 35/064 378/142 |
| 2015/0187536 A1* | 7/2015 | Canfield | H05G 1/52 378/137 |
| 2015/0262400 A1* | 9/2015 | Howell | G06T 11/60 378/87 |
| 2016/0106387 A1* | 4/2016 | Kahn | G16H 50/20 378/62 |
| 2016/0155598 A1* | 6/2016 | Shiozawa | H05G 1/10 378/62 |
| 2016/0358740 A1* | 12/2016 | Hu | H01J 35/065 |
| 2017/0011880 A1* | 1/2017 | Hu | H01J 35/065 |
| 2017/0110283 A1* | 4/2017 | Shirota | G01N 23/04 |
| 2017/0281118 A1* | 10/2017 | Hirayu | A61B 6/586 |
| 2017/0318651 A1* | 11/2017 | Canfield | H01J 35/14 |
| 2018/0033589 A1* | 2/2018 | Schamber | H01J 37/26 |
| 2018/0144901 A1* | 5/2018 | Yun | H01J 35/26 |
| 2018/0358197 A1* | 12/2018 | Hu | H01J 35/08 |
| 2019/0051424 A1* | 2/2019 | Muehlhauser | A61B 6/4291 |
| 2019/0237287 A1* | 8/2019 | Masaki | H01J 35/147 |

\* cited by examiner

ELECTROMAGNETIC X-RAY CONTROL

FIELD

This disclosure relates generally to x-ray control, and more particularly, to electromagnetic x-ray control.

BACKGROUND

Non-destructive inspection is a useful tool for detecting inconsistencies, contamination, objects, or other characteristics of a structure without needing to disassemble or destroy the inspection target. X-rays are useful in performing non-destructive inspection. X-ray generation systems are energy intensive and produce significant waste heat and lost energy. Only a small percentage of the input energy results in usable x-rays.

SUMMARY

The subject matter of the present application has been developed in response to the present state of the art, and in particular, in response to the shortcomings of previous x-ray inspection techniques using micro-focus x-ray tubes that have not yet been fully solved by the currently available techniques. Accordingly, the subject matter of the present application has been developed to provide electromagnetic x-ray control and associated system and method that overcome at least some of the above-discussed shortcomings of previous techniques. More specifically, in some examples, the electromagnetic x-ray control of the present disclosure can provide greater efficiency and utility for a micro-focusing high-energy particles and/or radiation compared to previous apparatus, systems, and methods.

Disclosed herein is an apparatus for electromagnetic x-ray control. The apparatus comprises a thermionic filament, positioned at a first end of a micro-focus x-ray tube and configured to generate an electron stream. The apparatus also comprises an x-ray generation target, positioned within the micro-focus x-ray tube at a second end of the micro-focus x-ray tube, opposite the first end, to receive the electron stream and to generate x-rays in response to the electron stream impinging on the x-ray generation target. The apparatus further comprises an electromagnetic field element, configured to generate an electromagnetic field that receives the electron stream and operable to vary the electromagnetic field to redirect the electron stream, within the micro-focus x-ray tube, to impinge on the x-ray generation target at variable locations on the x-ray generation target. Each one of the variable locations corresponds to a different one of multiple variations of the electromagnetic field. The preceding subject matter of this paragraph characterizes example 1 of the present disclosure.

The apparatus further comprises a focusing anode positioned to focus the electron stream within the micro-focus x-ray tube. The preceding subject matter of this paragraph characterizes example 2 of the present disclosure, wherein example 2 also includes the subject matter according to example 1, above.

The focusing anode is positioned between the thermionic filament and the electromagnetic field element. The preceding subject matter of this paragraph characterizes example 3 of the present disclosure, wherein example 3 also includes the subject matter according to example 2, above.

The apparatus further comprises an accelerating anode positioned to accelerate the electron stream within the micro-focus x-ray tube. The preceding subject matter of this paragraph characterizes example 4 of the present disclosure, wherein example 4 also includes the subject matter according to any one of examples 1-3, above.

The accelerating anode is positioned between the thermionic filament and the electromagnetic field element. The preceding subject matter of this paragraph characterizes example 5 of the present disclosure, wherein example 5 also includes the subject matter according to example 4, above.

The electromagnetic field element is operable to redirect the electron stream into a rastering pattern to raster the x-rays generated by the x-ray generation target. The preceding subject matter of this paragraph characterizes example 6 of the present disclosure, wherein example 6 also includes the subject matter according to any one of examples 1-5, above.

The x-ray generation target is fixed relative to the micro-focus x-ray tube. The preceding subject matter of this paragraph characterizes example 7 of the present disclosure, wherein example 7 also includes the subject matter according to any one of examples 1-6, above.

Also disclosed herein is a system for non-destructive x-ray inspection. The system comprises an inspection object. The system also comprises an x-ray inspection device positioned proximal the inspection object and operable to direct x-rays to the inspection object. The x-ray inspection device comprises an apparatus for electromagnetic x-ray control. The apparatus comprises an electromagnetic field element operable to generate an electromagnetic field to induce movement of the x-rays along the inspection object. The x-ray inspection device also comprises a detector to receive object x-rays from the inspection object and determine a characteristic of the inspection object in response to reception of the object x-rays. The preceding subject matter of this paragraph characterizes example 8 of the present disclosure.

The x-ray inspection device further comprises a cooling system configured to dissipate heat from the x-ray inspection device. The preceding subject matter of this paragraph characterizes example 9 of the present disclosure, wherein example 9 also includes the subject matter according to example 8, above.

The x-ray inspection device further comprises a power management system configured to supply power to the apparatus for electromagnetic x-ray control. The preceding subject matter of this paragraph characterizes example 10 of the present disclosure, wherein example 10 also includes the subject matter according to any one of examples 8-9, above.

The power management system supplies no more than between approximately 1 milliamp and approximately 10 milliamps to the apparatus. The preceding subject matter of this paragraph characterizes example 11 of the present disclosure, wherein example 11 also includes the subject matter according to example 10, above.

The x-ray inspection device further comprises a control device configured to vary properties of the electromagnetic field to induce the movement of the x-rays along the inspection object. The preceding subject matter of this paragraph characterizes example 12 of the present disclosure, wherein example 12 also includes the subject matter according to any one of examples 8-11, above.

The x-ray inspection device is operable to deflect the x-rays in a first dimension. The preceding subject matter of this paragraph characterizes example 13 of the present disclosure, wherein example 13 also includes the subject matter according to any one of examples 8-12, above.

The x-ray inspection device is operable to deflect the x-rays in a second dimension different from the first dimension. The preceding subject matter of this paragraph characterizes example 14 of the present disclosure, wherein example 14 also includes the subject matter according to example 13, above.

Further disclosed herein is a method of electromagnetically controlling x-rays. The method of electromagnetically controlling x-rays comprises applying power to heat a thermionic filament, emitting an electron stream from the thermionic filament, generating an electromagnetic field at the electron stream, changing the electromagnetic field to deflect the electron stream, receiving the electron stream at an x-ray generation target, and generating x-rays in response to the electron stream impinging on the x-ray generation target. The preceding subject matter of this paragraph characterizes example 15 of the present disclosure.

The x-rays are between approximately 75 keV and approximately 80 keV. The preceding subject matter of this paragraph characterizes example 16 of the present disclosure, wherein example 16 also includes the subject matter according to example 15, above.

Applying power to heat the thermionic filament comprises applying between approximately 1 milliamp and approximately 10 milliamps. The preceding subject matter of this paragraph characterizes example 17 of the present disclosure, wherein example 17 also includes the subject matter according to any one of examples 15-16, above.

Changing the electromagnetic field comprises oscillating the electromagnetic field to raster the x-rays. The preceding subject matter of this paragraph characterizes example 18 of the present disclosure, wherein example 18 also includes the subject matter according to any one of examples 15-17, above.

Changing the electromagnetic field comprises oscillating the electromagnetic field to raster the x-rays in two dimensions. The preceding subject matter of this paragraph characterizes example 19 of the present disclosure, wherein example 19 also includes the subject matter according to example 18, above.

Receiving the electron stream at the x-ray generation target comprises maintaining the x-ray generation target stationary and receiving the electron stream at a location on the x-ray generation target corresponding to the deflection of the electron stream within the electromagnetic field. The preceding subject matter of this paragraph characterizes example 20 of the present disclosure, wherein example 20 also includes the subject matter according to any one of examples 15-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Figure 1:
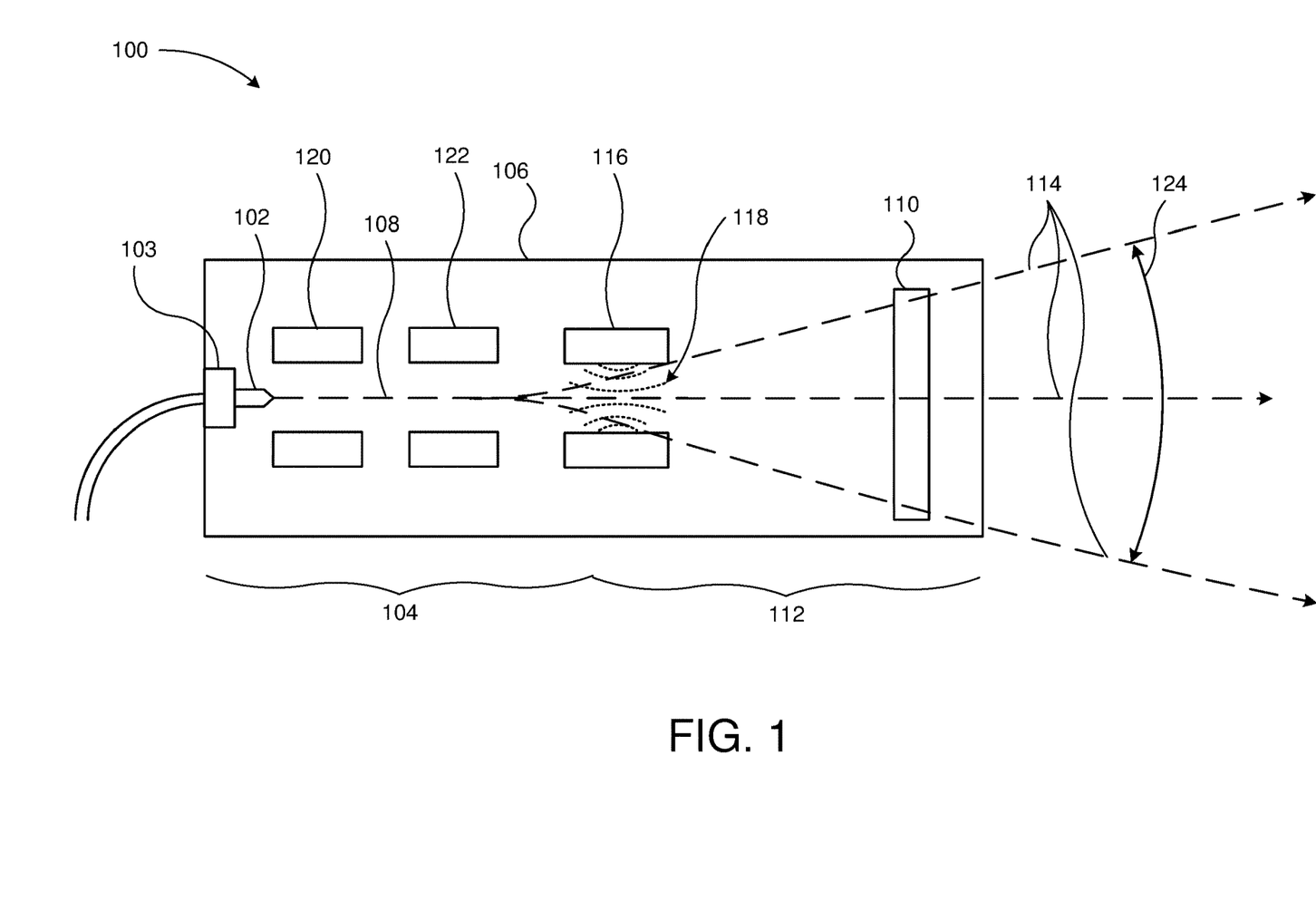
FIG. 1 is a diagram of an apparatus for electromagnetic x-ray control, according to two or more embodiments of the present disclosure.

Referring to FIG. 1, an apparatus 100 for electromagnetic x-ray control is shown. In some embodiments, the apparatus 100 includes a thermionic filament 102, an x-ray generation target 110, and an electromagnetic field element 116. In the illustrated embodiment, the thermionic filament 102 is positioned at a first end 104 of a micro-focus x-ray tube 106. The thermionic filament 102 is configured to generate an electron stream 108. The thermionic filament 102 may be disposed centrally within the micro-focus x-ray tube 106, near an edge or side of the micro-focus x-ray tube 106, or at another location.

While the micro-focus x-ray tube 106 is described herein as cylindrical, the micro-focus x-ray tube 106 may have a non-cylindrical geometry. The micro-focus x-ray tube 106 may have a uniform cross-section along the length of the micro-focus x-ray tube 106 or the cross-section may vary. Additionally, in some embodiments, the micro-focus x-ray tube 106 may be a vacuum or near-vacuum vessel.

The x-ray generation target 110 is positioned within the micro-focus x-ray tube 106 at a second end 112 of the micro-focus x-ray tube 106. The second end 112 of the micro-focus x-ray tube 106 is opposite the first end 104. The x-ray generation target 110 is configured to generate x-rays 114 in response to the electron stream 108 impinging on the x-ray generation target 110. The x-ray generation target 110 may be fixed within the micro-focus x-ray tube 106. Alternatively, the x-ray generation target 110 may be rotated or otherwise moved within, or relative to, the micro-focus x-ray tube 106 to provide additional cooling or heat capacity of the x-ray generation target 110.

The electromagnetic field element 116 is configured to generate an electromagnetic field 118 that receives the electron stream 108. The electromagnetic field element 116 is operable to vary the electromagnetic field 118 to redirect the electron stream 108, within the micro-focus x-ray tube 106, to impinge on the x-ray generation target 110 at variable locations on the x-ray generation target 110. Each of the variable locations may correspond to a different one of multiple variations of the electromagnetic field 118. By applying the electromagnetic field 118 to redirect the electron stream 108, the x-rays 114 generated by the x-ray generation target 110 are directed from the apparatus 100 in a direction within a deflection range 124.

The electromagnetic field element 116 may be configured to oscillate the electromagnetic field 118 to deflect or bend the electron stream 108 in one or more dimensions. For example, the electromagnetic field element 116 may oscillate the electromagnetic field 118 to move the electron stream 108 in is a first dimension. In another example, the electromagnetic field element 116 may oscillate the electromagnetic field 118 to move the electron stream 108 in is a second dimension. The electromagnetic field element 116 may also manipulate the electromagnetic field 118 to deflect the electron stream 108 in more than one dimension. The manipulation of the electromagnetic field 118 may facilitate a rastering or other scanning pattern or movement of the electron stream 108.

Redirection of the electron stream 108 to move between variable locations on the x-ray generation target 110 also reduces a dwell time of the electron stream 108 on any one location on the x-ray generation target 110. This improves the capability of the x-ray generation target 110 to handle the energy of the electron stream 108 particularly in the form of heat. This reduces a chance of damage to the x-ray generation target 110 and also allows for a relatively higher energy electron stream 108 to be used within the apparatus 100. As presented above, the x-ray generation target 110 may also be rotated or otherwise moved to further aid in cooling of the x-ray generation target 110. Other supplemental cooling systems may also be incorporated.

In some embodiments, the apparatus 100 includes a focusing anode 120. The focusing anode 120 is positioned to focus the electron stream 108 within the micro-focus x-ray tube 106. The focusing anode 120 may be positioned between the thermionic filament 102 and the electromagnetic field element 116. The focusing anode 120 may provide a focusing electromagnetic field to apply a focusing affect on the electron stream 108 to collimate, taper, or otherwise condition the electron stream 108. The focusing anode 120 may maintain a fixed focusing electromagnetic field or may create a variable focusing electromagnetic field at the electron stream 108 to apply the focusing effect to the electron stream 108 generated at the thermionic filament 102. Incorporation of the focusing anode 120 allows for improved resolution with reduced shadowing and other negative imaging effects. Additionally, incorporation of the focusing anode 120 reduces the power requirement for the apparatus 100 while maintaining resolution typically associated with higher power levels.

In some embodiments, the apparatus 100 includes an accelerating anode 122 positioned to accelerate the electron stream 108 within the micro-focus x-ray tube 106. The accelerating anode 122 is shown as being positioned between the thermionic filament 102 and the electromagnetic field element 116. In the illustrated embodiment, the accelerating anode 122 is positioned between the focusing anode 120 and the electromagnetic field element 116. Alternatively, the accelerating anode 122 may be positioned between the thermionic filament and the focusing anode 120.

The accelerating anode 122 creates an accelerating electromagnetic field at the electron stream 108 to apply an accelerating effect to the electron stream 108 upstream of the x-ray generation target 110. The accelerating effect applied by the accelerating anode 122 may be a constant effect or may be varied depending on one or more criteria of an inspection such as scanning depth, material, target resolution, or the like. The accelerating effect applied by the accelerating anode 122 increases the rate of generation of x-rays at the x-ray generation target 110 which improves the efficiency of the apparatus 100 without the need for an increased power input at the thermionic filament 102.

Figure 2:
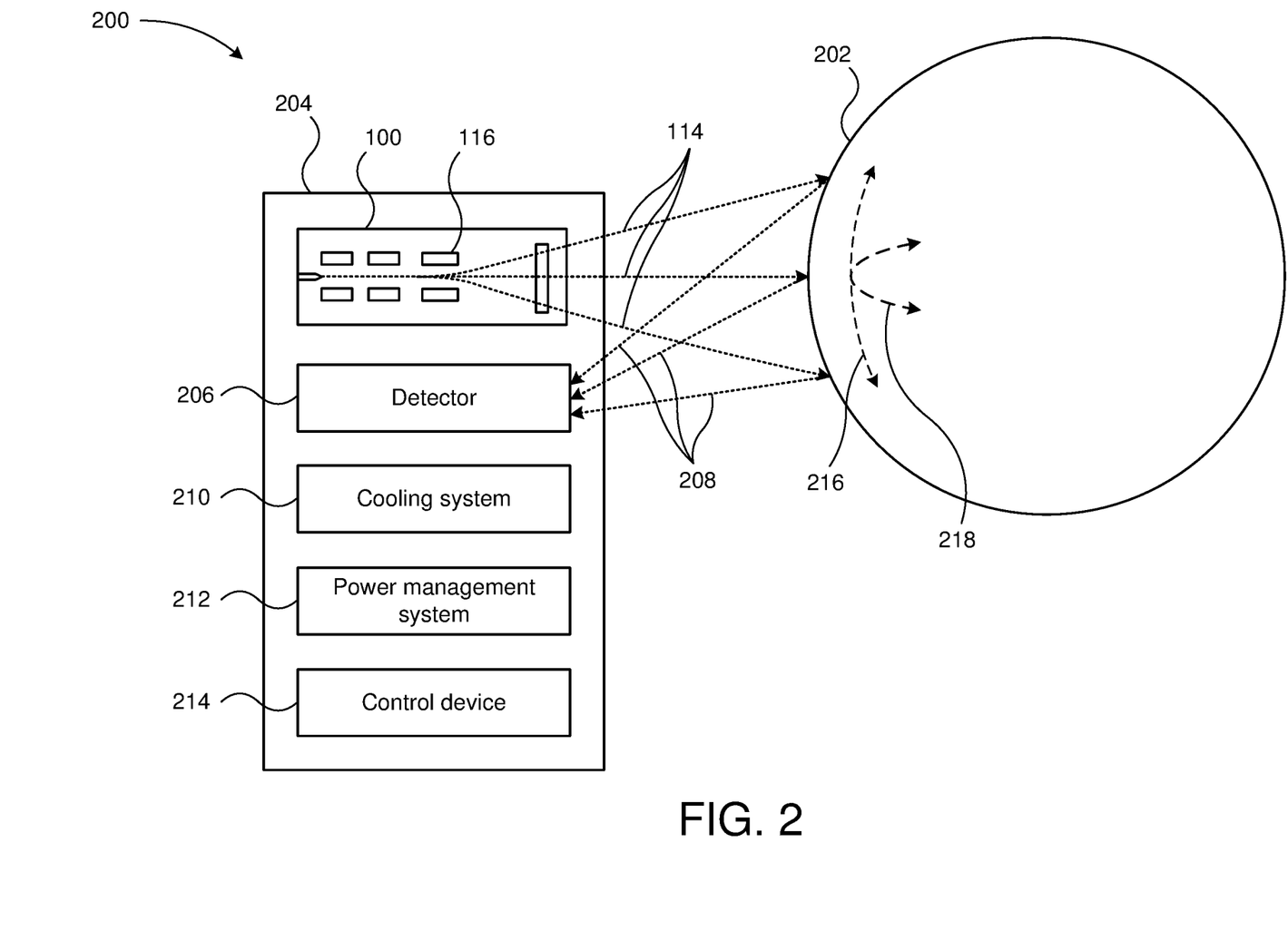
FIG. 2 is schematic block diagram of a system for non-destructive x-ray inspection, according to various embodiments of the present disclosure.

FIG. 2 illustrates a system 200 for non-destructive x-ray inspection. The system 200 includes an inspection object 202 and an x-ray inspection device 204 positioned proximal the inspection object 202. The x-ray inspection device 204 is operable to direct x-rays 114 to the inspection object 202. The x-ray inspection device 204 includes an apparatus 100 and a detector 206.

The apparatus 100 is for electromagnetic x-ray control and includes an electromagnetic field element 116. The electromagnetic field element 116 is operable to generate an electromagnetic field 118 to induce movement of the x-rays 114 along the inspection object 202. The x-rays 114 may be passed through the inspection object 202, absorbed by the inspection object 202, or reflected/scattered by the inspection object 202.

The electromagnetic field element 116 is operable to generate an electromagnetic field 118 to adjust a path of the x-rays 114. The adjustment in the path of the x-rays 114 can be used to create a rastering effect in the x-rays 114 to scan the inspection object 202. Instead of needing to move the apparatus 100 or the x-ray inspection device 204 to scan the x-rays 114 along the inspection object 202, the electromagnetic field element 116 deflects the x-rays 114 to form the scanning pattern which may take the form of a back-and-forth movement in one dimension 216 or 218 or a pattern of movement in multiple dimensions 216 and 218. The operation of the electromagnetic field element 116 may be configured to account for a characteristic of the inspection object 202 such as material, geometry, a flaw, inconsistency, or other target feature of the inspection object 202, a resolution, artifact avoidance, or other imaging characteristic, a position or orientation of the detector 206, available power, cooling load, inspection rate or area size, or the like.

The detector 206 receives object x-rays 208 from the inspection object 202 to determine a characteristic of the inspection object 202 in response to reception of the object x-rays 208. The detector 206 may be positioned to receive the object x-rays 208 that are backscattered by the inspection object 202 in a backscatter arrangement. A backscatter arrangement, with the detector 206 on the same side of the inspection object 202 as the apparatus 100, the detector 206 receives the object x-rays 208 that are backscattered by the inspection object 202 back towards the same side of the inspection object as the apparatus 100. Alternatively, the detector 206 may be positioned to receive the object x-rays 208 which pass through the inspection object 202. Other relative positions of the detector 206 relative to the inspection object 202 and the apparatus 100 may be implemented. The detector 206 is integrated with the apparatus 100 or may be remote to the apparatus 100.

The x-ray inspection device 204 may also include a cooling system 210 to dissipate heat from the x-ray inspection device 204. The cooling system 210 may be self-contained or may be coupled to an external cooling component such as a pump, heat exchanger, or the like. The cooling system 210 may be an active or passive cooling system. The cooling system 210 may be a solid-state cooling system or may utilize a fluid such as air, water, oil, or other coolant.

The x-ray inspection device 204 may also include a power management system 212. The power management system 212 supplies power to the apparatus 100 for electromagnetic x-ray control. The power management system 212 may also be coupled to one or more of the detector 206, the cooling system 210 or other components of the system 200 to provide power, monitor power consumption, or provide other functions relating to power supplied to components of the x-ray inspection device 204.

The x-ray inspection device 204 may also include a control device 214. The control device 214 provides operational control to one or more components of the x-ray inspection device 204. The control device 214 may be configured to control the apparatus 100. For example, the control device 214 may provide signals or other controlling means to control operations of one or more of the thermionic filament 103, the electromagnetic field element 116, the focusing anode 120, and the accelerating anode 122. The control device 214 may be configured to interface with the detector 206 to receive and interpret a signal or other information from the detector 206 corresponding to the object x-rays 208. The control device 214 may also be configured to control the cooling system 210 to manage a thermal property of the x-ray inspection device 204. Additionally, the control device 214 may control an operation of the power management system 212 to supply power to one or more components of the x-ray inspection device 204 or associated systems.

Figure 3:
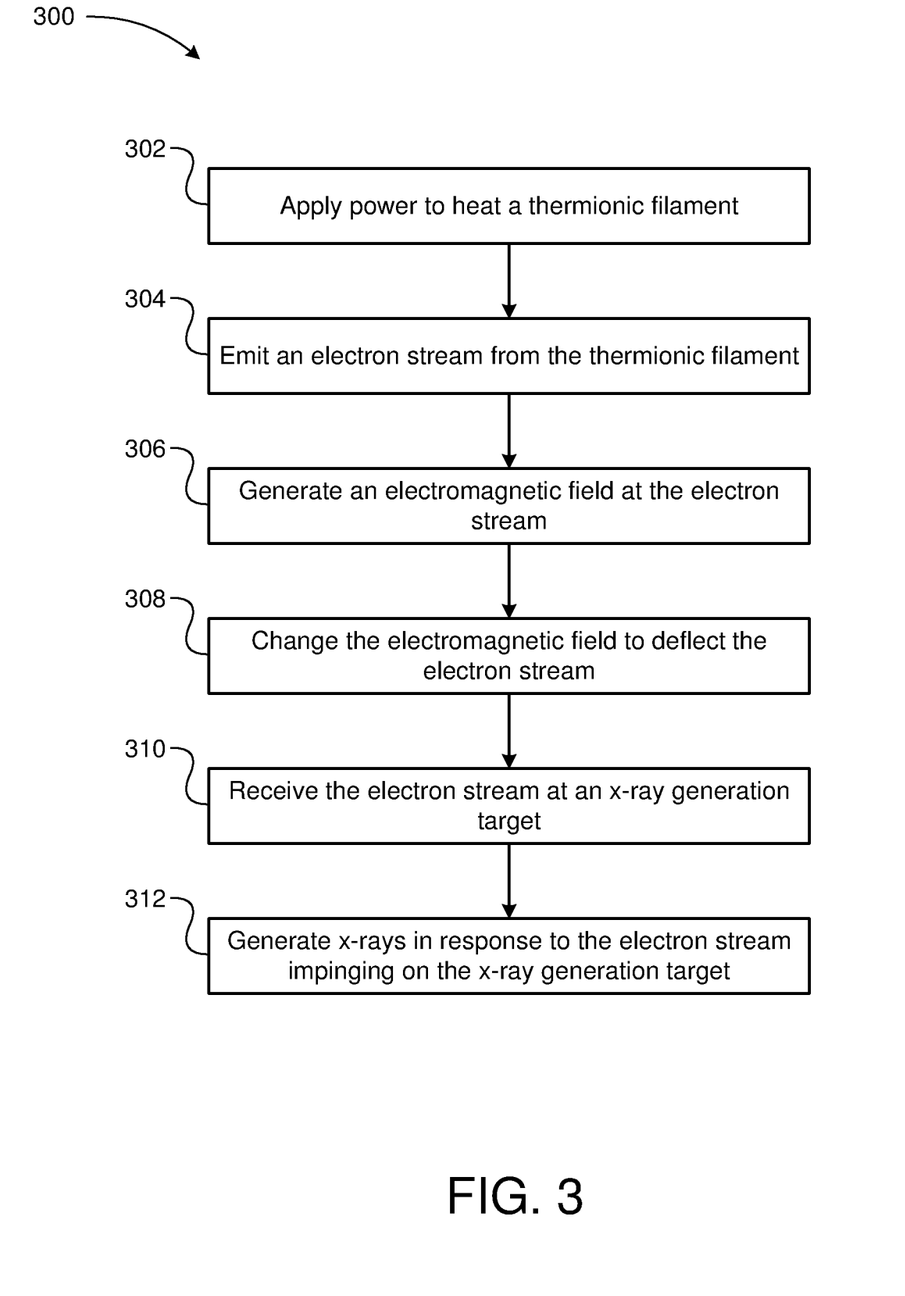
FIG. 3 is a flowchart of a method for electromagnetically controlling x-rays, according to one or more examples of the present disclosure.

FIG. 3 is a flow diagram of one embodiment of a method 300 of electromagnetically controlling x-rays. At least in the illustrated embodiment, the method 300 includes applying 302 power to heat a thermionic filament 102. The method 300 also includes emitting 304 an electron stream 108 from the thermionic filament 102. The method 300 further includes generating 306 an electromagnetic field 118 at the electron stream 108. The method 300 also includes changing 308 the electromagnetic field 118 to deflect the electron stream 108. The method 300 further includes receiving 310 the electron stream 108 at an x-ray generation target 110. The method 300 also includes generating 312 x-rays 114 in response to the electron stream 108 impinging on the x-ray generation target 110.

In some embodiments, the x-rays 114 are between approximately 75 keV and approximately 80 keV. Applying power to heat the thermionic filament 102 may include applying between approximately 1 milliamp and approximately 10 milliamps. Changing the electromagnetic field 118 may include oscillating the electromagnetic field 118 to raster the x-rays 114 in two dimensions 216 and 218. The method 300 may further include maintaining the x-ray generation target 110 stationary and receiving the electron stream 108 at a location on the x-ray generation target 110 corresponding to the deflection of the electron stream 108 within the electromagnetic field 118.

In the above description, certain terms may be used such as "up," "down," "upper," "lower," "horizontal," "vertical," "left," "right," "over," "under" and the like. These terms are used, where applicable, to provide some clarity of description when dealing with relative relationships. However, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for electromagnetic x-ray control, comprising:
    a thermionic filament, positioned at a first end of a micro-focus x-ray tube and configured to generate an electron stream directed along a constant axis;
    an x-ray generation target, positioned within the micro-focus x-ray tube at a second end of the micro-focus x-ray tube, opposite the first end, to receive the electron stream and to generate x-rays in response to the electron stream impinging on the x-ray generation target; and
    an electromagnetic field element, configured to generate an electromagnetic field that receives the electron stream and operable to vary the electromagnetic field to redirect the electron stream, within the micro-focus x-ray tube, to impinge on the x-ray generation target at variable locations on the x-ray generation target, with the variable locations corresponding to different variations of the electromagnetic field.

2. The apparatus of claim 1, further comprising a focusing anode positioned to focus the electron stream within the micro-focus x-ray tube.

3. The apparatus of claim 2, wherein the focusing anode is positioned between the thermionic filament and the electromagnetic field element.

4. The apparatus of claim 1, further comprising an accelerating anode positioned to accelerate the electron stream within the micro-focus x-ray tube.

5. The apparatus of claim 4, wherein the accelerating anode is positioned between the thermionic filament and the electromagnetic field element.

6. The apparatus of claim 1, wherein the electromagnetic field element is operable to redirect the electron stream into a rastering pattern to raster the x-rays generated by the x-ray generation target.

7. The apparatus of claim 1, wherein the x-ray generation target is fixed relative to the micro-focus x-ray tube.

8. A system for non-destructive x-ray inspection, the system comprising:
    an inspection object; and
    an x-ray inspection device positioned proximal the inspection object and operable to direct x-rays to the inspection object, the x-ray inspection device comprising:
        an apparatus for electromagnetic x-ray control, the apparatus comprising:
            a thermionic filament, positioned at a first end of a micro-focus x-ray tube and operable to generate an electron stream directed along a constant axis;
            an x-ray generation target, positioned within the micro-focus x-ray tube at a second end of the micro-focus x-ray tube, opposite the first end, operable to receive the electron stream and to generate x-rays in response to the electron stream impinging on the x-ray generation target; and
            an electromagnetic field element operable to generate an electromagnetic field to induce movement of the x-rays along the inspection object;
        a control device configured to vary properties of the electromagnetic field to redirect the electron stream, within the micro-focus x-ray tube, to impinge on the x-ray generation target at variable locations on the x-ray generation target, with the variable locations corresponding to different variations of the electromagnetic field; and
        a detector to receive object x-rays from the inspection object and determine a characteristic of the inspection object in response to reception of the object x-rays.

9. The system of claim 8, wherein the x-ray inspection device further comprises a cooling system configured to dissipate heat from the x-ray inspection device.

10. The system of claim 8, wherein the x-ray inspection device further comprises a power management system configured to supply power to the apparatus for electromagnetic x-ray control.

11. The system of claim 10, wherein the power management system supplies no more than between approximately 1 milliamp and approximately 10 milliamps to the apparatus.

12. The system of claim 8, wherein the x-ray inspection device is operable to deflect the x-rays in a first dimension.

13. The system of claim 12, wherein the x-ray inspection device is operable to deflect the x-rays in a second dimension different from the first dimension.

14. A method of electromagnetically controlling x-rays, comprising:
    applying power to heat a thermionic filament;
    emitting an electron stream directed along a constant axis from the thermionic filament;
    generating an electromagnetic field at the electron stream;
    changing the electromagnetic field to deflect the electron stream;
    receiving the electron stream at variable locations on an x-ray generation target, the variable locations corresponding to deflection of the electron stream within the electromagnetic field; and generating x-rays in response to the electron stream impinging on the x-ray generation target.

15. The method of claim 14, wherein the x-rays are between approximately 75 keV and approximately 80 keV.

16. The method of claim 14, wherein applying power to heat the thermionic filament comprises applying between approximately 1 milliamp and approximately 10 milliamps.

17. The method of claim 14, wherein changing the electromagnetic field comprises oscillating the electromagnetic field to raster the x-rays.

18. The method of claim 17, wherein changing the electromagnetic field comprises oscillating the electromagnetic field to raster the x-rays in two dimensions.

19. The method of claim 14, wherein receiving the electron stream at variable locations on the x-ray generation target comprises maintaining the x-ray generation target stationary and receiving the electron stream at the variable locations on the x-ray generation target corresponding to the deflection of the electron stream within the electromagnetic field.

20. The method of claim 14, wherein emitting an electron stream from the thermionic filament comprises using an accelerating anode to accelerate the electron stream.

\* \* \* \* \*